(12) United States Patent
Unno

(10) Patent No.: US 7,072,619 B2
(45) Date of Patent: Jul. 4, 2006

(54) TRANSMISSION-POWER CONTROL ASSISTING APPARATUS FOR IMPROVED TRANSMISSION-POWER CONTROL OF A RADIO TRANSMITTER

(75) Inventor: Masataka Unno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 10/342,738

(22) Filed: Jan. 15, 2003

(65) Prior Publication Data

US 2004/0014425 A1 Jan. 22, 2004

(30) Foreign Application Priority Data

Jul. 19, 2002 (JP) .............................. 2002-211124

(51) Int. Cl.
*H04B 1/00* (2006.01)
*H04B 7/00* (2006.01)

(52) U.S. Cl. ...................... 455/69; 455/522; 455/127.1
(58) Field of Classification Search ................ 455/522, 455/69, 127.1, 226.1, 127.2; 370/331
See application file for complete search history.

(56) References Cited

U.S. PATENT DOCUMENTS

| | | | |
|---|---|---|---|
| 5,878,350 A * | 3/1999 | Nakamura et al. | ........... 455/442 |
| 5,920,823 A * | 7/1999 | Murai | .......................... 455/522 |
| 6,058,107 A * | 5/2000 | Love et al. | ................... 370/332 |
| 6,285,887 B1 * | 9/2001 | Mimura | ....................... 455/522 |
| 6,393,005 B1 * | 5/2002 | Mimura | ....................... 370/335 |
| 6,628,924 B1 * | 9/2003 | Miyamoto | ..................... 455/69 |
| 6,760,567 B1 * | 7/2004 | Jeong et al. | ............. 455/67.11 |
| 6,862,458 B1 * | 3/2005 | Kanemoto et al. | ........... 455/522 |

FOREIGN PATENT DOCUMENTS

| | | |
|---|---|---|
| JP | 2001-036466 | 2/2001 |
| JP | 2001-036942 | 2/2001 |
| JP | 2001-218253 | 8/2001 |
| JP | 2002-009694 | 1/2002 |

* cited by examiner

*Primary Examiner*—Tilahun Gesesse
(74) *Attorney, Agent, or Firm*—Katten Muchin Rosenman LLP

(57) ABSTRACT

The present invention relates to a transmission-power control assisting apparatus, a radio apparatus, and a radio terminal apparatus. In order to stably and highly maintain service quality, the transmission-power control assisting apparatus includes: a transmission quality monitoring section monitoring an error in transmission quality of any one of a plurality of radio channels on which transmission-power control is performed; a period determining section determining a predetermined period of time from a point in time of an opportunity to append a radio channel other than the specific radio channel to the plurality of radio channels; a desired-value setting section setting a desired value for the transmission power of the specific radio channel to a value larger than such a value as to suppress the error during the period of time; and a transmission-power update requesting section notifying the desired value to a transmitting end.

24 Claims, 9 Drawing Sheets

FIG. 6

| BIT RATE (kbps) | INCREMENT (dB) |
|---|---|
| 19.2 | 0.6 |
| 38.4 | 0.8 |
| 76.8 | 1.0 |
| 153.6 | 1.1 |

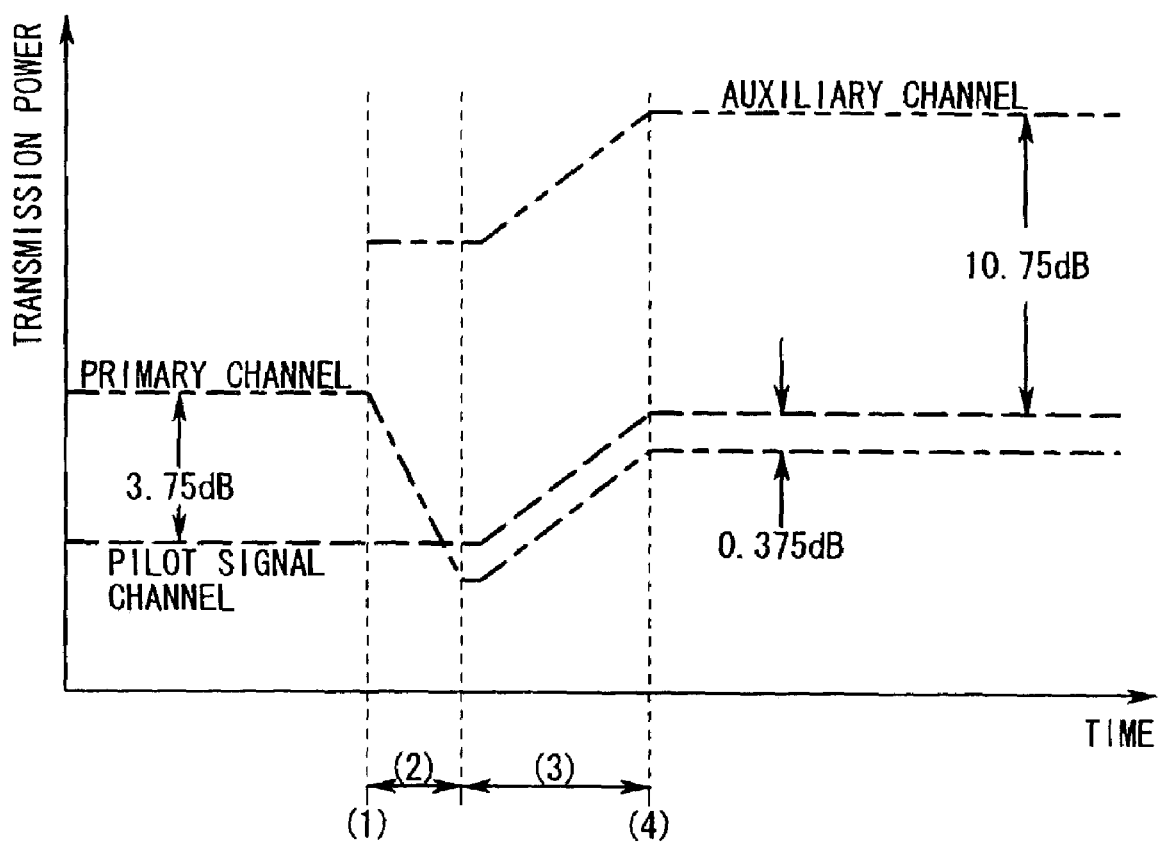
PRIOR ART    FIG. 9

TRANSMISSION-POWER CONTROL ASSISTING APPARATUS FOR IMPROVED TRANSMISSION-POWER CONTROL OF A RADIO TRANSMITTER

BACKGROUND OF THE INVENTION

1. Field of the Invention

The present invention relates to a transmission-power control assisting apparatus and a radio apparatus which notify information used for transmission-power control to be performed, based on an arriving wave reaching a local station, by a transmitting end of the arriving wave to the transmitting end in a radio transmission system, and to a radio terminal apparatus corresponding to the transmitting end.

2. Description of the Related Art

A CDMA (Code Division Multiple Access) system has been positively applied to a mobile communication system since it has confidentiality and interference immunity and a transmission-power control technology not only flexibly adaptable to multimedia and various modes of channel allocation but also capable of solving a near-far problem has been established.

FIG. 8 is a diagram showing a configuration example of a mobile communication system to which the CDMA system is applied.

In FIG. 8, an output of a RAKE receiving part 51 is connected to inputs of demodulating parts 52-F, 52-S and an Ec/Io measuring part 53-P. An output of the demodulating part 52-F is connected to an outgoing route of an upstream communication link and connected to one of inputs of an instruction selecting part 57 via a frame error measuring part 54-F, a frame error rate judging part 55-F, and a desired-value increase and decrease instructing part 56-F. An output of the demodulating part 52-S is connected to the outgoing route of the upstream communication link and connected to the other input of the instruction selecting part 57 via a frame error measuring part 54-S, a frame error rate judging part 55-S, and a desired-value increase and decrease instructing part 56-S. An output of the instruction selecting part 57 is connected to one of inputs of an Ec/Io judging part 59-P via a desired-value setting part 58, and an output of the above Ec/Io measuring part 53-P is connected to the other input of the Ec/Io judging part 59-P. An output of the Ec/Io judging part 59-P is connected to a corresponding input of an inserter 61 via a power-control-bit generating part 60, and an incoming route of a downstream communication link which makes a pair with the above upstream communication link is connected to a specific input of the inserter 61. An output of the inserter 61 is connected to a not-shown antenna system (used for forming a radio transmission path which is connected to a terminal 63), to which an input of the above RAKE receiving part 51 is also connected, via a spread processing part 62.

Incidentally, the RAKE receiving part 51, the demodulating parts 52-F, 52-S, the Ec/Io measuring part 53-P, the desired-value increase and decrease instructing parts 56-F, 56-S, the instruction selecting part 57, the desired-value setting part 58, the Ec/Io judging part 59-P, the power-control-bit generating part 60, the inserter 61, and the spread processing part 62 are provided in a radio base station of the above mobile communication system, and the frame error measuring parts 54-F, 54-S and the frame error rate judging parts 55-F, 55-S are provided in a base station controlling station which, in addition to performing channel control relating to a single or a plurality of radio base station(s) including the radio base station, operates in association with a switching network (mobile switch or the like) to perform call set-up.

In the mobile communication system as configured above, the RAKE receiving part 51 receives an arriving wave transmitted from the terminal 63 via the radio transmission path and extracts, from the arriving waves, components individually received via the following 'pilot signal channel', 'primary channel', and 'auxiliary channel' allotted to the terminal 63 under predetermined channel allocation and channel control.

- the 'primary channel' which is allotted, when the terminal 63 originates, regardless of the kind of the call (for example, either a call to which a transmission service of an audio speech signal is provided or a call to which a transmission service of a data signal together with or not corresponding to the speech signal is provided) and which has a predetermined transmission capacity
- the 'auxiliary channel' allotted together with the 'primary channel' to the call to which the data transmission service is provided
- the 'pilot signal channel' whose transmission power is set to a 'reference transmission power' which serves as a reference of transmission powers of these 'primary channel' and 'auxiliary channel'

The Ec/Io measuring part 53-P finds a power proportion Ec/Io as a proportion of a level of thus extracted component of the 'pilot signal channel' to the sum total of levels of the above arriving waves.

Meanwhile, the demodulating parts 52-F, 52-S demodulate the components received via the 'primary channel' and the 'auxiliary channel', respectively, to generate base band signals for the respective components.

The frame error measuring parts 54-F, 54-S measure error rates of a frame sequence (hereinafter, referred to as a 'frame error rate FER-F' and a 'frame error rate FER-S') included in these baseband signals in a predetermined form.

The frame error rate judging pats 55-F, 55-S judge whether or not thus measured frame error rates FER-F, FER-S are lower than predetermined thresholds in parallel respectively.

The desired-value increase and decrease instructing parts 56-F, 56-S output binary information with a logical value of '1' or '0' indicating that a desired value for the above power proportion Ec/Io is to be updated to a larger value or a smaller value according to the 'true' or 'false' result of these judgments, respectively.

The instruction selecting part 57 outputs, depending on the logical value of the above binary information, binary information (hereinafter, referred to as an 'increase and decrease instruction') according to any one of the following rules.

- one piece of the binary information outputted by the desired-value increase and decrease instructing part 56-F out of the desired-value increase and decrease instructing parts 56-F, 56-S
- the other piece of the binary information outputted by the desired-value increase and decrease instructing part 56-S out of the desired-value increase and decrease instructing parts 56-F, 56-S
- either one of the pieces of the binary information having a logical value of '1' out of the binary information outputted by the desired-value increase and decrease instructing parts 56-F, 56-S
- either one of the pieces of the binary information having a logical value of '0' out of the binary information outputted by the desired-value increase and decrease instructing parts 56-F, 56-S The desired-value setting part 58 increments and decrements a previously set desired value for the power proportion Ec/Io (hereinafter, referred to as a 'desired value') by a predetermined value (>0) when the logical value of the increase and decrease instruction is '1' and when, on the other hand, the logical value is '0', respectively, thereby updating the desired value.

The Ec/Io judging part 59-P finds a difference between thus updated desired value and the power proportion Ec/Io found by the Ec/Io measuring part 53-P.

The power-control-bit generating part 60 generates a 'power control bit' whose logical value is set to '0' when the difference exceeds a predetermined reference value, and set to '1' when, on the other hand, the difference is lower than the reference value.

The inserter 61 inserts the above-mentioned 'power control bit' to a specific field, out of fields of individual frames given via the downstream communication link and including transmission information, which is secured in advance based on the forms of these frames.

The spread processing part 62 generates a transmission signal modulated according to the frame sequence to which the 'power control bit' is thus inserted and conforming to a predetermined CDMA system, and transmits the transmission signal to the terminal 63 via the above antenna system.

The terminal 63 extracts the above 'power control bit' from the frame sequence which is restored by the demodulation of the transmission signal.

The terminal 63 also increases or decreases the transmission power of the pilot signal channel depending on the logical value of the 'power control bit', and sets the transmission powers of the 'primary channel' and the 'auxiliary channel' to the products of two proportions which are given in advance or set (updated) based on the channel control procedure thereof by the transmission power, respectively.

In other words, the transmission powers of both the 'primary channel' and the 'auxiliary channel' are set in parallel at such values as to maintain the above-mentioned proportions relative to the transmission power of the 'pilot signal channel' which is increased or decreased as is described above in association with the radio base station.

Consequently, even when the combination of the radio channels allotted to the terminal 63 varies according to the mode of the communication service to be provided to the terminal 63, the transmission powers of these 'primary channel', 'auxiliary channel', and 'pilot signal channel' are maintained at such values as to maintain the above power proportion Ec/Io.

Incidentally, in the conventional art described above, for example, the 'primary channel' and the 'pilot signal channel' are allotted, and after the point in time when the 'auxiliary channel' is newly allotted to the terminal 63 to which the 'auxiliary channel' has not been allotted and the transmission via the 'auxiliary channel' is started (FIG. 9 (1)), the sum total of the powers of the arriving waves reaching the radio base station from the terminal 63 increases.

Therefore, the terminal 63 controls the transmission power of the 'primary channel' to be decreased so as to maintain the above power proportion Ec/Io after such a point in time (FIG. 9 (2)).

The transmission powers of these 'primary channel', 'auxiliary channel', and 'pilot signal channel' are increased step by step in parallel according to the logical value '1' of the 'power control bit' continuously given from the radio base station (FIG. 9 (3)), thereby converging in proper values so as to solve the near-far problem (FIG. 9 (4)).

Further, since the time required for the transmission powers of these 'primary channel', 'auxiliary channel', and 'pilot signal channel' to converge in the proper values generally ranges from 10 odd seconds to 20 seconds (>20× $10-3 \times 100 \times 4$ decibel/0.5 decibel) due to the conditions described below, the deterioration in transmission quality mentioned above is difficult to be tolerated.

In order to obtain the above increase and decrease instruction with high precision, the above transmission quality has to be evaluated at least 100 times or more at a frame frequency of approximately 20 milliseconds.

In the case when the transmission via the 'auxiliary channel' is additionally started while the transmission via only the 'primary channel' and the 'pilot signal channel' is performed, the range in which the transmission power of the 'pilot signal channel' is to be varied generally becomes larger as the proportion of the transmission rate and the band of the 'auxiliary channel' to those of the 'primary channel' is higher, and is highly possible to become at least 4 decibels.

However, the increase and decrease amount of the above increase and decrease instruction is generally set to a small value of approximately 0.5 decibel.

Further, in the above mobile communication system, a proportion of the sum total of bands of the 'primary channel' and the 'auxiliary channel' allowed to be allotted to a completed call that has occurred in the terminal 63 together with the 'primary channel' to the band of the 'primary channel' is highly possible to increase also in the future in accordance with the demand for provision of various modes of services such as 'packet transmission' and others.

Therefore, in such a mobile communication system, there has been a strong demand for a technology to solve the above deterioration in the transmission quality with high reliability without impairing the solution of the near-far problem based on the predetermined transmission-power control.

SUMMARY OF THE INVENTION

It is an object of the present invention to provide a transmission-power control assisting apparatus, a radio apparatus, and a radio terminal apparatus in which service quality is stably and highly maintained without any significant change in the basic configuration.

It is another object of the present invention to reduce power consumption and improve transmission quality and service quality in a radio transmission system to which these inventions are applied without any significant change in the basic procedure and configuration relating to transmission-power control.

It is still another object of the present invention to highly maintain transmission quality while realizing adaptability to various modes of channel allocation and channel control procedure without any significant change in the basic configuration.

It is yet another object of the present invention to highly maintain transmission quality while realizing adaptability to various modes of channel allocation and channel control procedure.

It is yet another object of the present invention to make effective use of the channel capacity of a radio transmission path which is formed to be connected to a radio base station, thereby highly maintaining efficiency of channel control and call setting which are to be performed primarily.

It is yet another object of the present invention to reduce unnecessary power consumption which is caused in conventional art at a transmitting end performing transmission via a plurality of radio channels and to prevent or reduce interference and disturbance occurring in other radio stations due to a transmission signal transmitted from the transmitting end.

It is yet another object of the present invention to enable adaptability to performance and responsiveness relating to transmission-power control at a transmitting end and to prevent, with high reliability, the transmission power of any one of a plurality of radio channels from becoming unnecessarily excessive.

It is yet another object of the present invention to stably and highly maintain service quality as well as transmission quality.

It is yet another object of the present invention to reduce or avoid an 'unnecessary re-trial of channel control' and deterioration in transmission quality which are caused due to the fact that transmission-power control is not performed efficiently enough in spite of a high channel capacity and transmission quality.

It is yet another object of the present invention to prevent, with high reliability, the transmission power of any one of radio channels from becoming unnecessarily excessive without any load increase relating to channel control or any change in procedure.

The above objects are achieved by a transmission-power control assisting apparatus which is characterized in that a predetermined period of time from either a point in time of an opportunity to append a radio channel other than a specific radio channel to a plurality of radio channels to be set transmission powers en bloc as a value relative to a transmission power of the specific radio channel, or from a point in time when the radio channel is allowed to be appended is determined, and a desired value for the transmission power of the specific radio channel is set to such a value as to suppress an error corresponding to a lack of transmission quality during a period other than the predetermined period of time and to a value larger than the predetermined value during the predetermined period of time.

In the transmission-power control assisting apparatus as described above, compared with the case when the above period is fixed regardless of the above transmission quality, a length of a 'period during which the desired value for the transmission power is set to a unnecessarily large value even though the transmission quality is not significantly lowered' is shortened.

The above objects are achieved by a transmission-power control assisting apparatus which is characterized in that the smaller the above error is, the longer the length of the period is set to be.

In the transmission-power control assisting apparatus as described above, compared with the case when the above period is fixed regardless of the transmission quality, the length of a 'period during which the desired value for the transmission power is set to an unnecessarily large value even though the transmission quality is not significantly lowered' is shortened.

The above objects are achieved by a transmission-power control assisting apparatus which is characterized in that on the above opportunity, a value higher than the desired value for the transmission power of the specific radio channel which is to be set at the point in time is determined and the higher value is notified to a transmitting end via any one of the plurality of radio channels, and when a response transmitted from the transmitting end and indicating that the transmission power of the specific radio channel is set to the higher value is discriminated, the notification of the desired value to the transmitting end is suspended.

In the transmission-power control assisting apparatus as described above, an end point of a period during which the above desired value is notified to the transmitting end is maintained at the point in time when the transmission power of the specific radio channel is set to the desired value by the transmitting end.

The above objects are achieved by a transmission-power control assisting apparatus which is characterized in that on the above opportunity, a value higher than the desired value for the transmission power of the specific radio channel which is to be set at the point in time is determined and the higher value is notified to the transmitting end via any one of the plurality of radio channels, and when the transmission power of the specific radio channel notified from the transmitting end is equal to or higher than the higher value, the notification of the desired value to the transmitting end is suspended.

In the transmission-power control assisting apparatus as described above, an end point of a period during which the above desired value is notified to the transmitting end is maintained at the point in time when the transmission power of the specific radio channel is set to the desired value by the transmitting end.

The above objects are achieved by a transmission-power control assisting apparatus which is characterized in that the above large value is set to a value exceeding a steady-state value, which is a value of the transmission power of the specific radio channel after the radio channel other than the specific radio channel is appended, and a length of the period is set to be short to such an extent that the transmission powers of the plurality of radio channels do not exceed maximum transmission powers allowable for the transmission powers.

In the transmission-power control assisting apparatus as described above, when some kind of radio channel is appended to the plurality of radio channels, the transmission powers of the radio channels quickly converge in the steady-state values within a range of responsiveness not only of the transmitting end but also of the transmission-power control assisting apparatus according to the present invention.

The above objects are achieved by a transmission-power control assisting apparatus which is characterized in that the desired value for the transmission power of the specific radio channel is set to a larger value, the larger the value is for a channel capacity of the radio channel to be appended, or for a transmission rate to be secured within a range of the channel capacity.

In the transmission-power control assisting apparatus as described above, transmission-power control performed in association between the transmission-power control assisting apparatus according to the present invention and the above transmitting end is achieved more efficiently, the higher the above channel capacity or transmission rate is.

The above objects are achieved by a transmission-power control assisting apparatus which is characterized in that the desired value is set not for the transmission power of the specific radio channel but for a proportion of the transmission power.

In the transmission-power control assisting apparatus as described above, when the radio channel other than the specific radio channel is appended, a decrease in the transmission power which may possibly be caused in the radio channels other than the appended radio channel due to the fact that the above relative value is not changed at all is improved or avoided, as long as the length of the above period and the desired value for the transmission power of the specific radio channel are proper.

The above objects are achieved by a transmission-power control assisting apparatus which is characterized in that the desired value is set not for the transmission power of the specific radio channel but for a proportion of the transmission power.

In the transmission-power control assisting apparatus as described above, compared with the case when the above period is fixed regardless of the transmission quality, the length of a 'period during which the desired value for the proportion of the transmission power is set to an unnecessarily large value even though the transmission quality is not significantly lowered' is shortened.

The above objects are achieved by a transmission-power control assisting apparatus which is characterized in that on the above opportunity, the proportion of transmission power of the specific radio channel is determined at a value higher than a proportion of transmission power of the specific radio channel which is to be set at the point in time, and the determined proportion is notified to the transmitting end via any one of the plurality of radio channels, and when a response indicating that the proportion of transmission power of the specific radio channel is set to the higher value is discriminated, the notification of a deviation in the desired value to the transmitting end is suspended.

In the transmission-power control assisting apparatus as described above, an end point of a period during which the above higher value is notified to the transmitting end is maintained at the point in time when the proportion of transmission power of the specific radio channel is set to the higher value by the transmitting end.

The above objects are achieved by a transmission-power control assisting apparatus which is characterized in that on the above opportunity, a value higher than a proportion of transmission power of the specific radio channel which is to be set at the point in time is determined, and the higher value is notified to the transmitting end via any one of the plurality of radio channels, and when the proportion of transmission power of the specific radio channel notified from the transmitting end has the higher value, the notification of a deviation in the desired value to the transmitting end is suspended.

In the transmission-power control assisting apparatus as described above, an end point of a period during which the above higher value is notified to the transmitting end is maintained at the point in time when the proportion of transmission power of the specific radio channel is set to the higher value by the transmitting end.

The above objects are achieved by a transmission-power control assisting apparatus which is characterized in that the above large value is set to a value exceeding a steady-state value, which is a value of the proportion of transmission power of the specific radio channel after the radio channel other than the specific radio channel is appended, and a length of the period is set to be short to such an extent that the transmission powers of the plurality of radio channels do not exceed maximum transmission powers allowable for the transmission powers.

In the transmission-power control assisting apparatus as described above, when some kind of radio channel is appended to the plurality of radio channels, the transmission powers of the radio channels quickly converge in the steady-state values within a range of responsiveness not only of the transmitting end but also of the transmission-power control assisting apparatus according to the present invention.

The above objects are achieved by a transmission-power control assisting apparatus which is characterized in that the monitored error of the transmission quality is compared with a predetermined upper limit value, and the notification is suspended at a point in time when the error becomes lower than the upper limit value.

In the transmission-power control assisting apparatus as described above, the notification to the transmitting end is terminated at a proper point in time without being accompanied by the complication of a procedure relating to the association with the transmitting end and the exchange of peculiar information realizing the association.

The above objects are achieved by a transmission-power control assisting apparatus which is characterized in that the desired value for the proportion of transmission power of the specific radio channel is set to a larger value, the larger the value is for a channel capacity of the radio channel to be appended, or for a transmission rate to be secured within a range of the channel capacity.

In the transmission-power control assisting apparatus as described above, transmission-power control performed in association between the transmission-power control assisting apparatus according to the present invention and the above transmitting end is achieved more efficiently, the higher the above channel capacity or transmission rate is.

The above objects are achieved by a radio apparatus to which the above-described transmission-power control assisting apparatus is applied.

In the radio apparatus as described above, a decrease in a transmission power of a first radio channel which may possibly occur when magnitude relation in transmission powers is reversed between the first radio channel and a second radio channel, which will be described later, is improved or reduced by updating the above reference.

The above objects are achieved by a radio terminal apparatus provided with a function that a transmission power of a specific radio channel is set, under the transmission-power control, to a value notified from a facing radio station, the notification being made when the setting is done.

In the radio terminal apparatus as described above, the transmission-power control is performed with high reliability according to increase and decrease of a radio channel in association between the radio terminal apparatus according to the present invention and the above radio station, and it is avoided that information relating to updating of the transmission power is unnecessarily transmitted from the radio station repeatedly or continuously.

The above objects are achieved by a radio terminal apparatus provided with a function of notifying the transmission power of the specific radio channel which is set under the transmission-power control to a radio station which faces the radio terminal apparatus via any one of the plurality of radio channels.

In the radio terminal apparatus as described above, the transmission-power control is performed with high reliability under the control of the above radio station, while realizing adaptability to performance and responsiveness of the radio terminal apparatus according to the present invention, as long as the frequency at which the above transmission power is notified is proper. Further, it is avoided that information relating to updating of the transmission power is unnecessarily transmitted from the radio station repeatedly or continuously.

The above objects are achieved by a radio terminal apparatus provided with a function that a proportion of the transmission power of the specific radio channel to a sum total of the transmission powers of the plurality of radio channels is set, under the transmission-power control, to a value notified from a facing radio station, the notification being made when the setting is done.

In the radio terminal apparatus as described above, the transmission-power control is performed with high reliability according to increase and decrease of a radio channel in association between the radio terminal apparatus according to the present invention and the above radio station, and it is avoided that information relating to updating of the transmission power is unnecessarily transmitted from the radio station repeatedly or continuously.

The above objects are achieved by a radio terminal apparatus provided with a function of notifying a proportion set under the transmission-power control to a radio station which faces the radio terminal apparatus via any one of the plurality of radio channels, the proportion being a proportion of the transmission power of the specific radio channel to a sum total of the transmission powers of the plurality of radio channels.

In the radio terminal apparatus as described above, the transmission-power control is performed with high reliability under the control of the above radio station, while realizing adaptability to performance and responsiveness of the radio terminal apparatus according to the present invention, as long as the frequency at which the above transmission power is notified is proper. Further, it is avoided that information relating to updating of the transmission power is unnecessarily transmitted from the radio station repeatedly or continuously.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6 is a table showing one example of increased amounts appropriate for bit rates;

FIG. 9 is a chart explaining a problem to be solved in conventional art.

DESCRIPTION OF THE PREFERRED EMBODIMENTS

The principle of a transmission-power control assisting apparatus according to the present invention will be explained.

Figure 1:
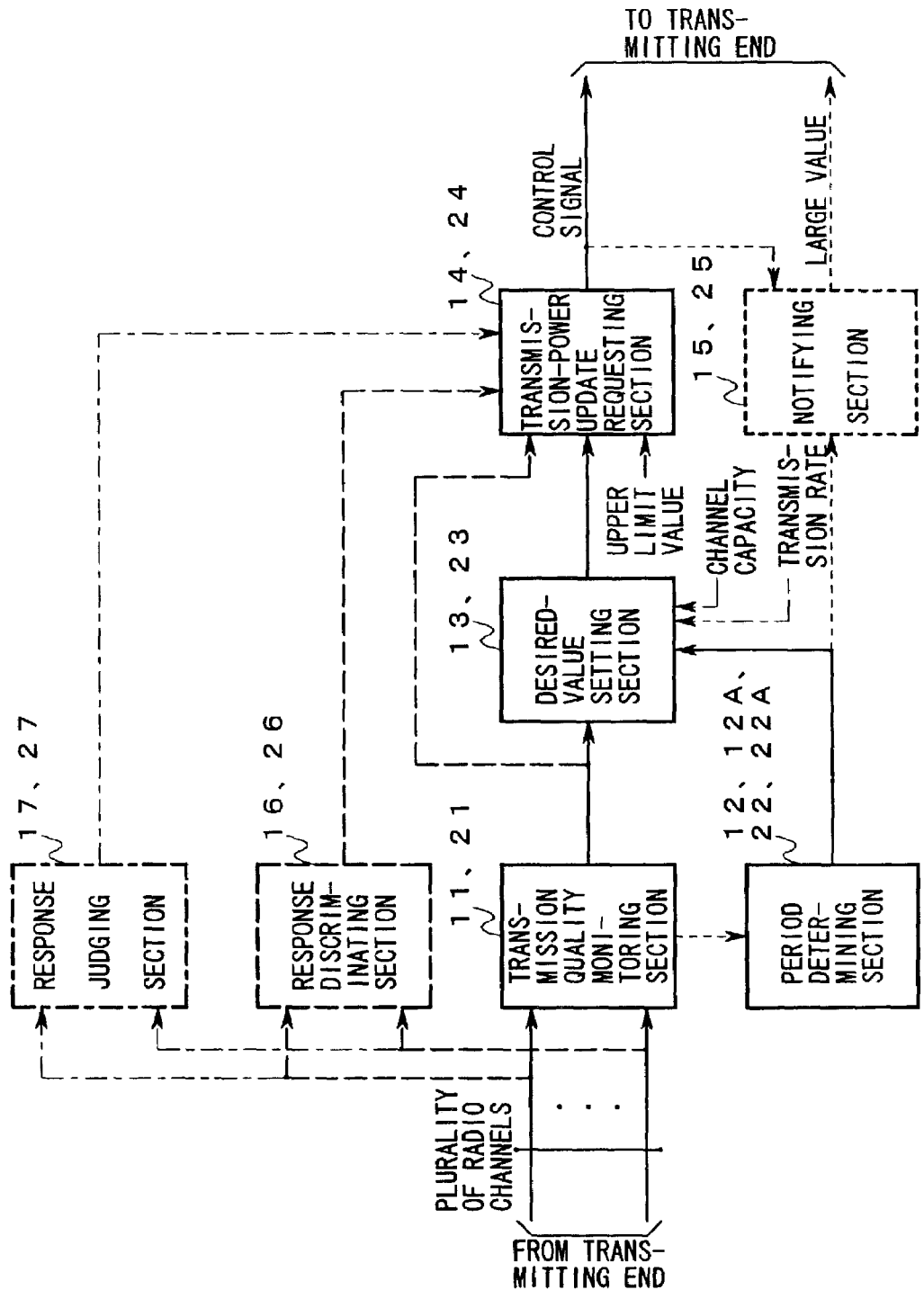
FIG. 1 is a block diagram showing the principle of a transmission-power control assisting apparatus according to the present invention.

FIG. 1 is a block diagram showing the principle of the transmission-power control assisting apparatus according to the present invention.

The transmission-power control assisting apparatus shown in FIG. 1 is composed of a transmission quality monitoring section 11 and 21, a period determining section 12, 12A, 22, and 22A, a desired-value setting section 13 and 23, a transmission-power update requesting section 14 and 24, a notifying section 15 and 25, a response discriminating section 16 and 26, and a response judging section 17 and 27.

The principle of a first transmission-power control assisting apparatus according to the present invention is as follows.

The transmission quality monitoring section 11 monitors an error, relative to a predetermined threshold, in transmission quality of any one of a plurality of radio channels which includes a specific radio channel, the plurality of radio channels to be set transmission powers en bloc as a value relative to a transmission power of the specific radio channel under transmission-power control. The period determining section 12 determines a predetermined period of time from either a point in time of an opportunity to append a radio channel other than the specific radio channel to the plurality of radio channels, or from a point in time when the radio channel is allowed to be appended. The desired-value setting section 13 varies a desired value for the transmission power of the specific radio channel by a predetermined value to suppress the error during a period other than the predetermined period of time and by a value larger than the predetermined value during the predetermined period of time. The transmission-power update requesting section 14 transmits at a predetermined frequency a control signal for the transmission-power control to a transmitting end performing transmission via the plurality of radio channels, based on relation between the desired value set by the desired-value setting section 13 and reception quality of the above plurality of radio channels.

In the transmission-power control assisting apparatus as described above, when the radio channel other than the specific radio channel is appended, a decrease in the transmission power which may possibly be caused in the radio channels other than the appended radio channel due to the fact that the above relative value is not changed at all is improved or avoided as long as the length of the above period and the desired value for the transmission power of the specific radio channel are proper.

Further, during the period other than the determined period, the transmission-power control is performed for each of the plurality of radio channels en bloc based on the above-mentioned relative value.

Consequently, the transmission quality is highly maintained while realizing adaptability to various modes of channel allocation and channel control procedure without any significant change in the basic configuration.

The principle of a second transmission-power control assisting apparatus according to the present invention is as follows.

The transmission quality monitoring section 11 monitors an error, relative to a predetermined threshold, in transmission quality of any one of a plurality of radio channels which includes a specific radio channel, the plurality of radio channels to be set transmission powers en bloc as a value relative to a transmission power of the specific radio channel under transmission-power control. The period determining section 12A determines a period of time, which is longer, the smaller the error is, from either a point in time of an opportunity to append a radio channel other than the specific radio channel to the plurality of radio channels, or from a point in time when the radio channel is allowed to be appended. The desired-value setting section 13 sets a desired value for the transmission power of the specific radio channel to such a value as to suppress the error during a period other than the period of time and to a value larger than the value during the period of time. The transmission-power update requesting section 14 transmits at a predetermined frequency a control signal for the transmission-power control to a transmitting end performing transmission via the above plurality of radio channels, based on relation between the desired value set by the desired-value setting section 13 and reception quality of the plurality of radio channels.

In other words, compared with the case when the above period is fixed regardless of the above transmission quality, the length of a 'period during which the desired value for the transmission power is set to an unnecessarily large value even though the transmission quality is not significantly lowered' is shortened.

Consequently, at the transmitting end performing transmission via the plurality of radio channels, unnecessary power consumption which is caused in conventional art is reduced, and interference and disturbance which may possibly occur in other radio stations due to a transmission signal transmitted from the transmitting end are prevented or reduced.

The principle of a third transmission-power control assisting apparatus according to the present invention is as follows.

On the above opportunity, the notifying section determines a value higher than the desired value for the transmission power of the specific radio channel which is to be set at the point in time of the opportunity and notifies the higher value to the transmitting end via any one of the plurality of radio channels. The response discriminating section 16 discriminates a response transmitted from the transmitting end via any one of the plurality of radio channels and indicating that the transmission power of the specific radio channel is set to the higher value. The transmission-power update requesting section 14 suspends the transmission of the control signal to the transmitting end when the response discriminating section 16 discriminates the response.

In other words, an end point of a period during which the above desired value is notified to the transmitting end is maintained at the point in time when the transmission power of the specific radio channel is set to the desired value by the transmitting end.

Consequently, adaptability to performance and responsiveness relating to the transmission-power control at the transmitting end is enabled and the transmission power of any one of the plurality of radio channels is prevented with high reliability from becoming unnecessarily excessive.

The principle of a fourth transmission-power control assisting apparatus according to the present invention is as follows.

On the opportunity, the notifying section 15 determines a value higher than the desired value for the transmission power of the specific radio channel which is to be set at the point in time of the opportunity and notifies the higher value to the transmitting end via any one of the plurality of radio channels. The response judging section 17 judges whether or not the transmission power of the specific radio channel notified from the transmitting end via any one of the plurality of radio channels has a value equal to or higher than the higher value. The transmission-power update requesting section 14 suspends the transmission of the control signal to the transmitting end when the judgment results to be true.

In other words, an end point of a period during which the above desired value is notified to the transmitting end is maintained at the point in time when the transmission power of the specific radio channel is set to the desired value by the transmitting end.

Consequently, adaptability to performance and responsiveness relating to transmission-power control at the transmitting end is enabled and the transmission power of any one of the plurality of radio channels is prevented with high reliability from becoming unnecessarily excessive.

The principle of a fifth transmission-power control assisting apparatus according to the present invention is as follows.

The above large value is set to a value exceeding a steady-state value, which is a value of the transmission power of the specific radio channel after the radio channel other than the specific radio channel is appended to the plurality of radio channels. Further, a length of the period is set to be short to such an extent that the transmission powers of the plurality of radio channels do not exceed maximum transmission powers allowable for the transmission powers.

In other words, when some kind of radio channel is appended to the plurality of radio channels, the transmission powers of the radio channels quickly converge in the steady-state values within a range of responsiveness not only of the transmitting end but also of the transmission-power control assisting apparatus according to the present invention.

Consequently, service quality as well as transmission quality is stably and highly maintained as long as the above large value and the length of the period conform to such responsiveness.

The principle of a sixth transmission-power control assisting apparatus according to the present invention is as follows.

The desired-value setting section 13 sets the desired value for the transmission power of the specific radio channel to a larger value, the larger the value is for a channel capacity of the radio channel to be appended at the opportunity, or for a transmission rate to be secured within a range of the channel capacity.

In other words, the transmission-power control performed in association between the transmission-power control assisting apparatus according to the present invention and the above transmitting end is achieved more efficiently, the higher the above channel capacity or transmission rate is.

Consequently, an 'unnecessary re-trial of channel control' and deterioration in transmission quality, which are caused due to the fact that the above transmission-power control is not performed efficiently enough even though the channel capacity and transmission quality are high, are reduced or avoided.

The principle of a seventh transmission-power control assisting apparatus according to the present invention is as follows.

The transmission quality monitoring section 21 monitors an error, relative to a predetermined threshold, in transmission quality of any one of a plurality of radio channels which includes a specific radio channel, the plurality of radio channels to be set transmission powers en bloc as a value relative to a transmission power of the specific radio channel under transmission-power control. The period determining section 22 determines a predetermined period of time from either a point in time of an opportunity to append a radio channel other than the specific radio channel to the plurality of radio channels, or from a point in time when the radio channel is allowed to be appended. The desired-value setting section 23 sets a desired value for a proportion of transmission power of the specific radio channel to a sum total of the transmission powers of the plurality of radio channels to such a value as to suppress the error during a period other than the period of time and to a value larger than the value during the period of time. The transmission-power update requesting section 24 compares a proportion with the desired value set by the desired-value setting section 23, the proportion being a proportion of a level of an arriving wave received via the specific radio channel to a sum total of levels of arriving waves received via the plurality of radio channels, and transmits at a predetermined frequency a control signal for the transmission-power control based on a difference between the proportion and the desired value to a transmitting end performing transmission via the plurality of radio channels.

In other words, when the radio channel other than the specific radio channel is appended, a decrease in the transmission power which may possibly be caused in the radio channels other than the appended radio channel due to the fact that the above relative value is not changed at all is improved or avoided as long as the length of the above period and the desired value for the transmission power of the specific radio channel are proper.

Meanwhile, during a period other than the period of time, the determination of the period and the setting of the desired value for the proportion of the transmission power are performed en bloc based on the above relative values.

Consequently, the transmission quality is highly maintained while realizing adaptability to various modes of channel allocation and channel control procedure without any significant change in the basic configuration.

The principle of an eighth transmission-power control assisting apparatus according to the present invention is as follows.

The transmission quality monitoring section 21 monitors an error, relative to a predetermined threshold, in transmission quality of any one of a plurality of radio channels which includes a specific radio channel, the plurality of radio channels to be set transmission powers en bloc as a value relative to a transmission power of the specific radio channel under transmission-power control. The period determining section 22A determines a period of time, which is longer, the smaller the error is, from either a point in time of an opportunity to append a radio channel other than the specific radio channel to the plurality of radio channels, or from a point in time when the radio channel is allowed to be appended. The desired-value setting section 23 sets a desired value for a proportion of the transmission power of the specific radio channel to a sum total of the transmission powers of the plurality of radio channels to such a value as to suppress the error during a period other than the period of time and to a value larger than the value during the period of time. The transmission-power update requesting section 24 compares a proportion with the desired value set by the desired-value setting section 23, the proportion being a proportion of a level of an arriving wave received via the specific radio channel to a sum total of levels of arriving waves received via the plurality of radio channels, and transmits at a predetermined frequency a control signal for the transmission-power control based on a difference between the proportion and the desired value to a transmitting end performing transmission via the plurality of radio channels.

In other words, compared with the case when the above period is fixed regardless of the above transmission quality, the length of a 'period during which the desired value for the proportion of the transmission power is set to an unnecessarily large value even though the transmission quality is not significantly lowered' is shortened.

Consequently, at the transmitting end performing transmission via the plurality of radio channels, unnecessary power consumption which is caused in conventional art is reduced, and interference and disturbance which may possibly occur in other radio stations due to a transmission signal transmitted from the transmitting end are prevented or reduced.

The principle of a ninth transmission-power control assisting apparatus according to the present invention is as follows.

On the opportunity, the notifying section 25 determines the proportion of the transmission power of the specific radio channel to be at a value higher than a proportion of the transmission power of the specific radio channel which is to be set at the point in time of the opportunity, and notifies the determined proportion to the transmitting end via any one of the plurality of radio channels. The response discriminating section 26 discriminates a response which is transmitted from the transmitting end via any one of the plurality of radio channels and which indicates that the proportion of the transmission power of the specific radio channel is set to the higher value. The transmission-power update requesting section 24 suspends the transmission of the control signal to the transmitting end when the response discriminating section 26 discriminates the response.

In other words, an end point of the period during which the above higher value is notified to the transmitting end is maintained at the point in time when the proportion of transmission power of the specific radio channel is set to the higher value by the transmitting end.

Consequently, adaptability to performance and responsiveness relating to the transmission-power control at the transmitting end is enabled and the transmission power of any one of the plurality of radio channels is prevented with high reliability from becoming unnecessarily excessive.

The principle of a tenth transmission-power control assisting apparatus according to the present invention is as follows.

On the opportunity, the notifying section 25 determines a value higher than a proportion of the transmission power of the specific radio channel which is to be set at the point in time of the opportunity, and notifies the higher value to the transmitting end via any one of the plurality of radio channels. The response judging section 27 judges whether or not the proportion of the transmission power notified from the transmitting end via any one of the plurality of radio channels has a value equal to the higher value. The transmission-power update requesting section 27 suspends the transmission of the control signal to the transmitting end when the judgment results to be true.

In other words, an end point of a period during which the above higher value is notified to the transmitting end is maintained at the point in time when the proportion of transmission power of the specific radio channel is set to the higher value by the transmitting end.

Consequently, adaptability to performance and responsiveness relating to the transmission-power control at the transmitting end is enabled and the transmission power of any one of the plurality of radio channels is prevented with high reliability from becoming unnecessarily excessive.

The principle of an eleventh transmission-power control assisting apparatus according to the present invention is as follows.

The above large value is set to a value exceeding a steady-state value, which is a value of the proportion of the transmission power of the specific radio channel after the radio channel other than the specific radio channel is appended to the plurality of radio channels.

Further, a length of the period is set to be short to such an extent that the transmission powers of the plurality of radio channels do not exceed maximum transmission powers allowable for the transmission powers.

In other words, when some kind of radio channel is appended to the plurality of radio channels, the transmission powers of the radio channels quickly converge in the steady-state values within a range of responsiveness not only of the transmitting end but also of the transmission-power control assisting apparatus according to the present invention.

Consequently, service quality as well as transmission quality is stably and highly maintained as long as the above large value and the length of the period conform to such responsiveness.

The principle of a twelfth transmission-power control assisting apparatus according to the present invention is as follows.

The transmission-power update requesting sections 14 and 24 compare the error monitored by the transmission quality monitoring sections 11 and 21 with a predetermined upper limit value, and suspend the transmission when the error becomes lower than the upper limit value.

In other words, such notification to the transmitting end is terminated at a proper point in time without being accompanied by the complication of a procedure relating to the association with the transmitting end and the exchange of peculiar information realizing the association.

Consequently, the transmission power of any one of the radio channels is prevented with high reliability from becoming unnecessarily excessive, without any increase in load relating to channel control or any change in the procedure.

The principle of a thirteenth transmission-power control assisting apparatus according to the present invention is as follows.

The desired-value setting section 23 sets the desired value for the proportion of transmission power of the specific radio channel to a larger value, the longer the value is for a channel capacity of the radio channel to be appended at the opportunity, or for a transmission rate to be secured within a range of the channel capacity.

In other words, the transmission-power control performed in association between the transmission-power control assisting apparatus according to the present invention and the above transmitting end is achieved more efficiently, the higher the above channel capacity or transmission rate is.

Consequently, an 'unnecessary re-trial of channel control' and deterioration in transmission quality, which are caused due to the fact that the above transmission-power control is not performed efficiently enough even though the channel capacity and transmission quality are high, are reduced or avoided.

Figure 2:
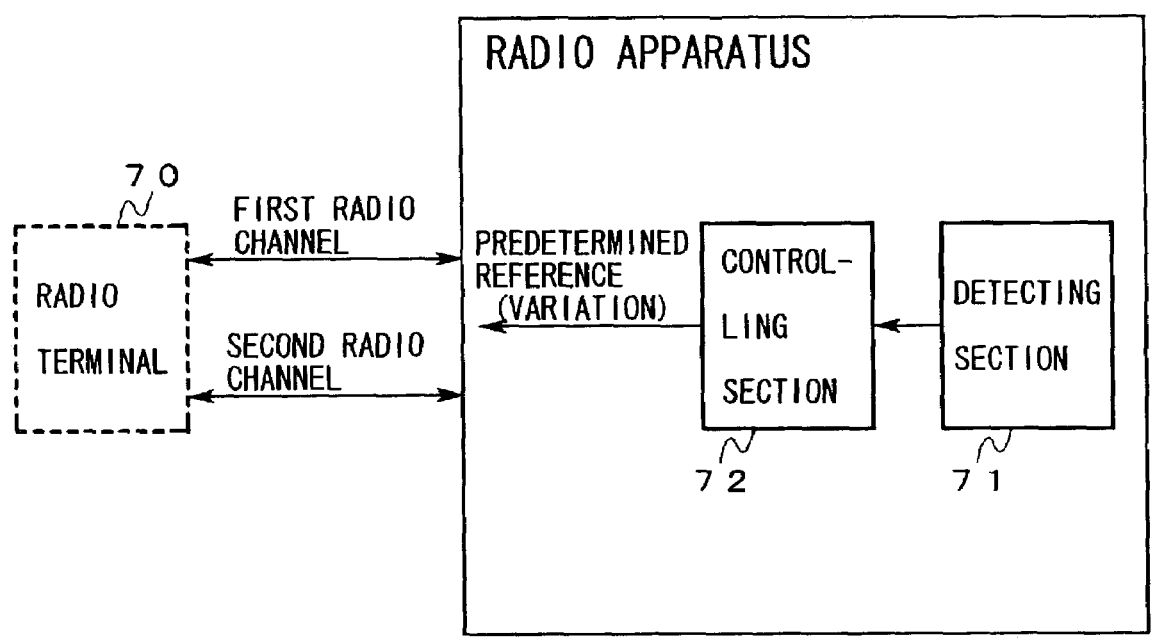
FIG. 2 is a block diagram showing the principle of a radio apparatus according to the present invention.

FIG. 2 is a block diagram showing the principle of a radio apparatus according to the present invention.

The radio apparatus shown in FIG. 2 is composed of a radio terminal 70, a detecting section 71, and a controlling section 72 and 72A.

The principle of a first radio apparatus according to the present invention is as follows.

The detecting section 71 detects that the radio terminal 70 starts to control magnitude relation in transmission powers between a first radio channel and a second radio channel to be reversed. The controlling section 72 updates, at the time of the detection, based on quality of the signal received via the first radio channel, a reference of a 'judgment on whether the transmission power of the first radio channel is to be increased or decreased in relation to the radio terminal 70' so as to easily cause the judgment to have a result that the transmission power is to be increased.

In other words, a decrease in the transmission power of the first radio channel which may possibly occur when the magnitude relation in the transmission powers between the first radio channel and the second radio channel is reversed is improved or reduced by updating the above reference.

Consequently, transmission quality is highly maintained while realizing adaptability to various modes of channel allocation and channel control procedure.

The principle of a second radio apparatus according to the present invention is as follows.

The detecting section 71 detects that the radio terminal 70 starts to control magnitude relation in transmission powers between the first radio channel and the second radio channel to be reversed. The controlling section 72A controls an amount of the variation after the detection to be larger than the amount of the variation before the detection, the amount of the variation being the amount of variation of a reference which is used for a judgment on whether the transmission power of the above first radio channel is to be increased or decreased in relation to the radio terminal 70 and which is to be varied according to quality of a signal received from the radio terminal 70 via a radio channel other than the first radio channel.

In other words, decrease in the transmission power of the first radio channel which may possibly occur when the magnitude relation in the transmission powers between the first radio channel and the second radio channel is reversed is improved or reduced with high precision by updating the above reference in synchronization with the reversion of the magnitude relation.

Consequently, transmission quality is stably and highly maintained while realizing adaptability to various modes of channel allocation and channel control procedure.

Figure 3:
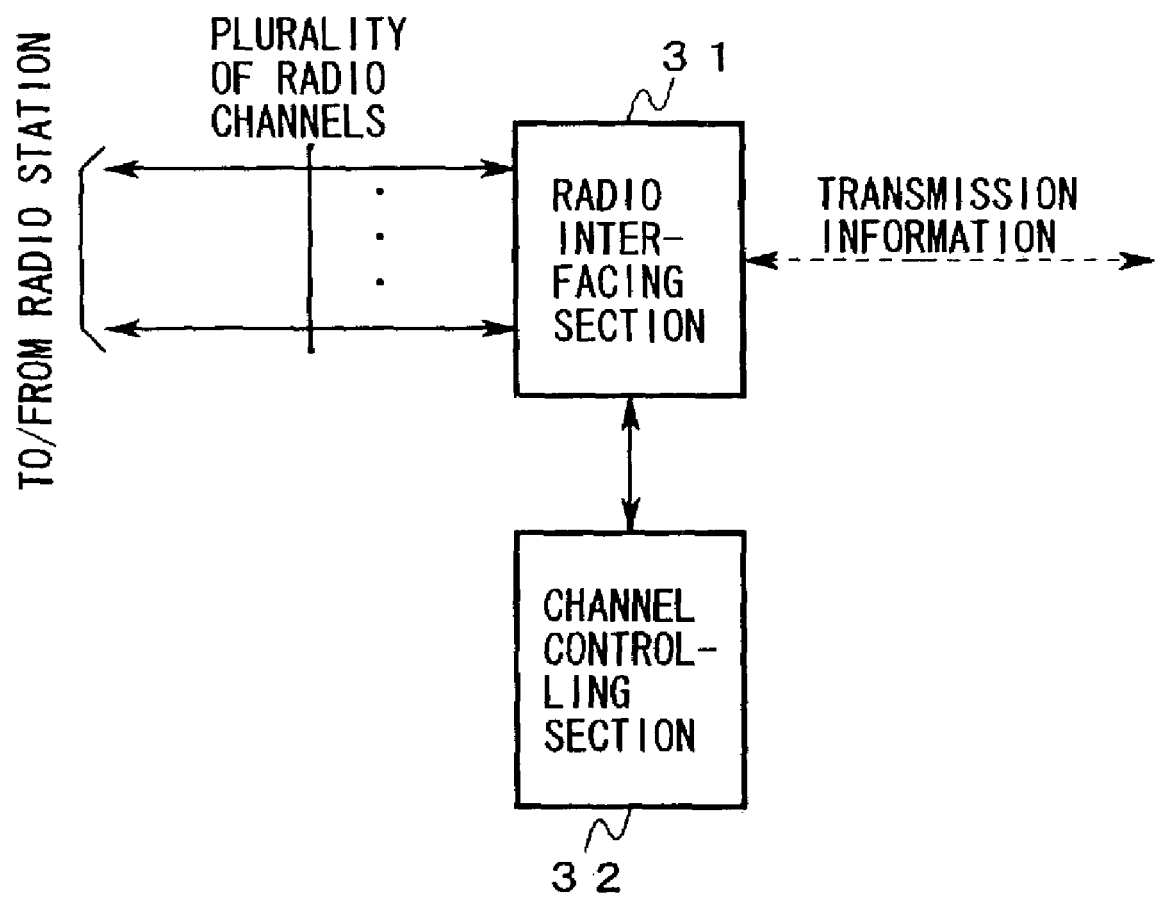
FIG. 3 is a block diagram showing the principle of a radio terminal apparatus according to the present invention.

FIG. 3 is a block diagram showing the principle of a radio terminal apparatus according to the present invention.

The radio terminal apparatus shown in FIG. 3 is composed of a radio interfacing section 31 and a channel controlling section 32.

The principle of a first radio terminal apparatus according to the present invention is as follows.

The radio interfacing section 31 radio-interfaces with a plurality of radio channels including a specific radio channel. The channel controlling section 32 operates in association with the radio interfacing section 31 to perform channel control relating to a call occurred in a local station and varies transmission powers of the plurality of radio channels as a value relative to a transmission power of the specific radio channel, thereby performing transmission-power control on the plurality of radio channels. The channel controlling section 32 notifies a radio station, which faces the radio terminal apparatus via any one of the plurality of radio channels, that the transmission power of the specific radio channel is set under the transmission-power control to a value notified from the radio station, the notification being made when the setting is done.

In other words, the transmission-power control is performed with high reliability according to increase and decrease of the radio channel in association between the radio terminal apparatus according to the present invention and the above radio station, and it is avoided that information relating to updating of the transmission power is unnecessarily transmitted from the radio station repeatedly or continuously.

Consequently, the channel capacity of a radio transmission path formed between the radio terminal apparatus and a radio base station is effectively put to practical use, thereby highly maintaining efficiency of channel control and call setting which are to be performed primarily.

The principle of a second radio terminal apparatus according to the present invention is as follows.

The radio interfacing section 31 radio-interfaces with a plurality of radio channels including a specific radio channel. The channel controlling section 32 operates in association with the radio interfacing section 31 to perform channel control relating to a call occurred in a local station and varies transmission powers of the plurality of radio channels as a value relative to a transmission power of the specific radio channel, thereby performing transmission-power control of the plurality of radio channels. The channel controlling section 32 notifies the transmission power of the specific radio channel which is set under the transmission-power control to a radio station which faces the radio terminal apparatus via any one of the plurality of radio channels.

In other words, the transmission-power control is performed with high reliability under the control of the above radio station while realizing adaptability to performance and responsiveness of the radio terminal apparatus according to the present invention, as long as the frequency at which the above transmission power is notified is proper. Further, it is avoided that information relating to updating of the transmission power is unnecessarily transmitted from the radio station repeatedly and continuously.

Consequently, the channel capacity of a radio transmission path formed between the radio terminal apparatus and the above radio base station is effectively put to practical use, thereby highly maintaining efficiency of channel control and call setting which are to be performed primarily.

The principle of a third radio terminal apparatus according to the present invention is as follows.

The radio interfacing section 31 radio-interfaces with a plurality of radio channels including a specific radio channel. The channel controlling section 32 operates in association with the radio interfacing section 31 to perform channel control relating to a call occurred in a local station and varies transmission powers of the plurality of radio channels as a value relative to a transmission power of the specific radio channel, thereby performing transmission-power control of the plurality of radio channels. The channel controlling section 32 notifies a radio station, which faces the radio terminal apparatus via any one of the plurality of radio channels, that a proportion of the transmission power of the specific radio channel to a sum total of the transmission powers of the plurality of radio channels is set under the transmission-power control to a value notified from the radio station, the notification being made when the setting is done.

In other words, the transmission-power control is performed with high reliability according to increase and decrease of the radio channel in association between the radio terminal apparatus according to the present invention and the above radio station, and it is avoided that information relating to updating of the transmission power is unnecessarily transmitted from the radio station repeatedly or continuously.

Consequently, the channel capacity of a radio transmission path formed between the radio terminal apparatus and the above radio base station is effectively put to practical use, thereby highly maintaining efficiency of channel control and call setting which are to be performed primarily.

The principle of a fourth radio terminal apparatus according to the present invention is as follows.

The radio interfacing section 31 radio-interfaces with a plurality of radio channels including a specific radio channel. The channel controlling section 32 operates in association with the radio interfacing section 31 to perform channel control relating to a call occurred in a local station and varies transmission powers of the plurality of radio channels as a value relative to a transmission power of the specific radio channel, thereby performing transmission-power control on the plurality of radio channels. The channel controlling section 32 notifies a proportion set under the transmission-power control to a radio station which faces the radio terminal apparatus via any one of the plurality of radio channels, the proportion being a proportion of the transmission power of the specific radio channel to a sum total of the transmission powers of the plurality of radio channels.

In other words, the transmission-power control is performed with high reliability under the control of the above radio station while realizing adaptability to performance and responsiveness of the radio terminal apparatus according to the present invention, as long as the frequency at which the above transmission power is notified is proper. Further, it is avoided that information relating to updating of the transmission power is unnecessarily transmitted from the radio station repeatedly or continuously.

Consequently, the channel capacity of a radio transmission path formed between the radio terminal apparatus and the above radio base station is effectively put to practical use, thereby highly maintaining efficiency of channel control and call setting which are to be performed primarily.

Embodiments of the present invention will be explained in detail below with reference to the drawings.

Figure 4:
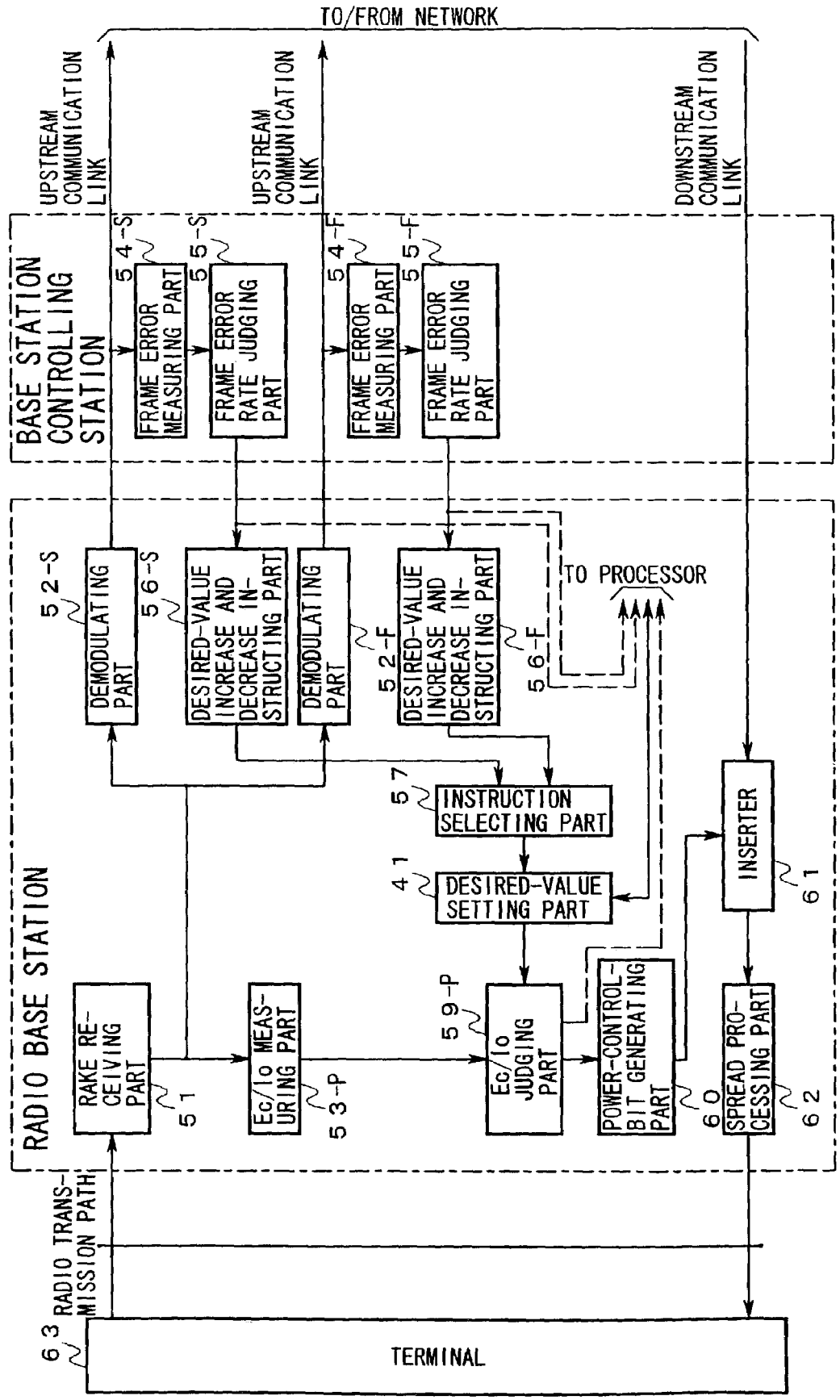
FIG. 4 is a diagram showing first to fifth embodiments of the present invention.

FIG. 4 is a diagram showing first to fifth embodiments of the present invention.

Here, a desired-value setting part 41 is connected to a specific I/O port of a not-shown processor (for simplicity, the is assumed here to be a processor playing a leading role in channel control) so that it can be controlled by the processor.

Figure 5:
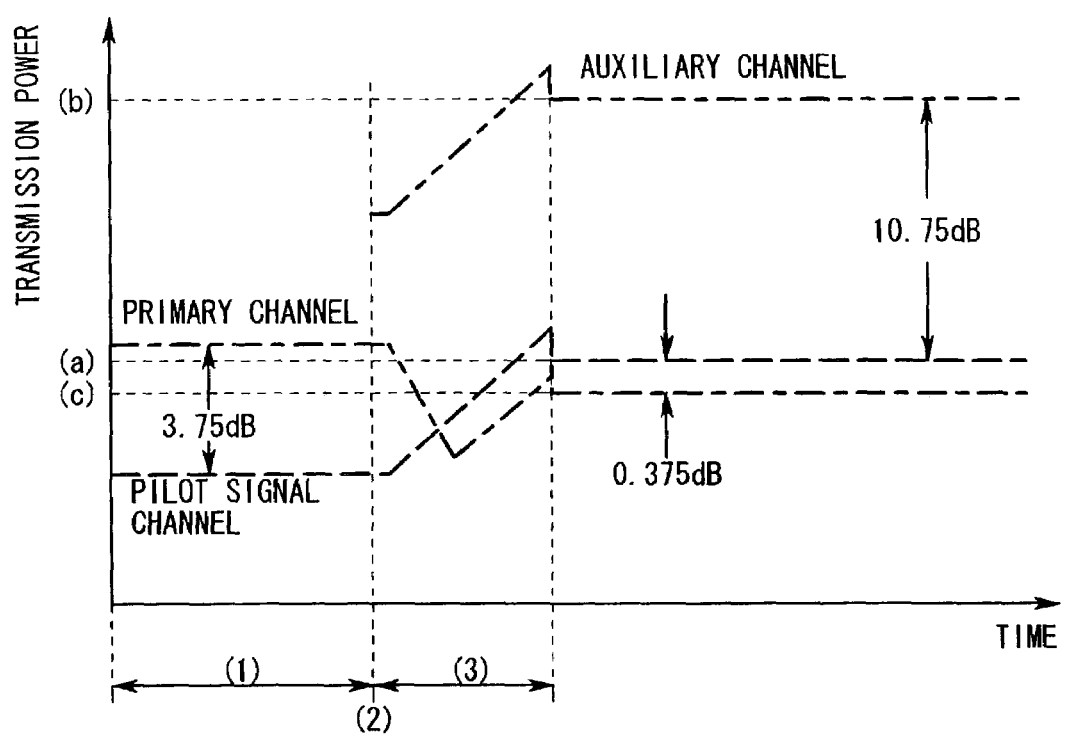
FIG. 5 is a chart explaining the operation of the first embodiment of the present invention.

FIG. 5 is a chart explaining the operation of the first embodiment of the present invention.

The operation of the first embodiment of the present invention will be explained below with reference to FIG. 4 and FIG. 5.

When, in the state in which only a single 'primary channel' is allotted to a terminal 63 in addition to a 'pilot signal channel' (the state in which such magnitude relation exists that the transmission power of the 'primary channel' is larger than that of the 'pilot signal channel' (specifically, these transmission powers are different by 3.75 dB)) (FIG. 5 (1)), the processor discriminates, based on a channel control procedure, a point in time when an 'auxiliary channel' is further allotted and transmission for the 'auxiliary channel' is started (hereinafter, referred to as an 'auxiliary channel appending point in time') (incidentally, from the point in time, the terminal starts a control operation so as to reverse the magnitude relation of the transmission power of the 'primary channel' relative to that of the 'pilot signal channel') (FIG. 5 (2)), the processor performs the following series of processing based on the channel control procedure.

to determine the transmission rate of the 'auxiliary channel' (or, an amount of information of data to be transferred per unit time via the auxiliary channel) (hereinafter, referred to simply as a 'bit rate')

to determine an increased amount (a larger value as the 'bit rate' is higher) stored in advance as a value appropriate for each of the 'bit rates' as shown in FIG. 6 to give the increased amount to the desired-value setting part 41 only during a period ranging over a preset 'fixed interval' from the above 'auxiliary channel appending point in time' (FIG. 5 (3))

The desired-value setting part 41 increases a preset desired value by the above increased amount when a logical value of an 'increase and decrease instruction' which is given by an instruction selecting part 57 similarly to the conventional art is '1'. Incidentally, the first increase may be executed not based the 'increase and decrease instruction' but immediately at the auxiliary channel appending point in time.

Such an increased amount is set for any of the bit rates to a larger value than "an increased amount in the state in which the 'auxiliary channel' is not allotted", and even when the increased amount set to the larger value is applied, the length of the above period is set in advance to such a value that none of values of the transmission powers of the 'pilot signal channel', the 'primary channel', and the 'auxiliary channel' become excessively larger than steady-state values (FIG. 5(*a*) to (*c*)) in which these transmission powers are to converge in the steady state.

In other words, the unnecessary decrease in transmission power and deterioration in transmission quality of the 'primary channel' which have occurred in the conventional art when the 'auxiliary channel' is appended as a radio channel to be allotted to a completed call that has occurred in the terminal 63 are eliminated with high reliability, so that transmission of desired transmission information via the 'auxiliary channel' is started more quickly than in the conventional example.

Consequently, according to this embodiment, service quality is enhanced at low cost and with high reliability without any significant change in the configuration of any of a radio base station, a base station controller, and the terminal 63.

The second embodiment of the present invention will be explained below.

In this embodiment, outputs of frame error rate judging parts 55-F, 55-S are also connected to corresponding input ports of the above processor.

Hereinafter, the operation of the second embodiment of the present invention will be explained with reference to FIG. 4.

The characteristic of this embodiment lies in the following processing procedure performed by the processor.

The processor accepts frame error rates FER-F, FER-S measured by the frame error rate judging parts 55-F, 55-S to process the following.

to select, out of these frame error rates FER-F, FER-S, the frame error rate FER to be reflected in the 'increase and decrease instruction' outputted to the desired-value setting part 41 by the instruction selecting part 57 to determine an interval having a shorter value as the frame error rate FER is lower (hereinafter, referred to as a 'variable interval') and apply the 'variable interval' instead of the above 'fixed interval', thereby setting the length of a period during which the increased amount is to be given to the desired-value setting part 41

Incidentally, in general, the time required for the transmission power of the 'auxiliary channel' to be set to (to converge in) a proper steady-state value from the 'auxiliary channel appending point in time' is shorter as the transmission quality evaluated as the above frame error rate FER is higher since difference between the steady-state value and the transmission power at the point in time when the transmission of the 'auxiliary channel' is started is smaller.

In other words, it is avoided that the transmission power of the 'auxiliary channel' has an excessively large value in the process in which the transmission power thereof is set to (converges in) the above steady-state value.

Consequently, according to this embodiment, as long as the 'variable interval' is set to a shorter value as the above transmission quality is higher and is set to a proper value, not only unnecessary power consumption at the terminal 63 but also 'interference and disturbance to both other terminals located in a wireless zone common to the terminal 63 and a radio base station forming the wireless zone' are prevented or reduced with high precision.

The third embodiment of the present invention will be explained below.

In this embodiment, an output of an Ec/Io judging part 59-P is connected to a corresponding input port of the above processor.

Hereinafter, the operation of the third embodiment of the present invention will be explained with reference to FIG. 4.

The characteristic of this embodiment lies in the following processing procedure performed by the processor.

The processor accepts the difference found by the Ec/Io judging part 59-P similarly to the conventional art to notify the difference to the terminal 63 based on the channel control procedure.

Incidentally, each of the parts operates in association with each other to notify such difference to the terminal 63 in the same manner as in the process of transmitting control information relating to ordinary channel control to the terminal 63 from a radio base station.

Meanwhile, the terminal 63 performs processing for increasing the above power proportion by thus notified difference, and at a point in time when the processing is completed (or a point in time, prior to the point in time, in "a known time required for a 'message', which will be described later, to be transmitted to the above processor via a radio transmission path"), it transmits the 'message' to that effect to the radio base station.

In the radio base station, the above processor, when discriminating the 'message' based on the channel control procedure, immediately terminates the processing of giving the increased amount to the desired-value setting part 41 even when the time passing from the 'auxiliary channel appending point in time" is shorter than the above 'fixed interval' (or the 'variable interval').

In other words, an end point of a period during which such an increased amount is given to the desired-value setting part 41 is maintained at a point in time when the above difference in the power proportion is practically decreased by the terminal 63 in association with the terminal 63.

Consequently, according to this embodiment, flexible adaptability to responsiveness and performance of the terminal 63 is realized and it is avoided with high reliability that the transmission powers of both the 'primary channel' and the 'auxiliary channel' become unnecessarily excessive.

Hereinafter, the operation of the fourth embodiment of the present invention will be explained with reference to FIG. 4 and FIG. 5.

The characteristic of this embodiment lies in the following processing procedure performed by the processor.

Every time the difference found by the Ec/Io judging part 59-P is updated, the processor holds the difference to process the following at a predetermined frequency.

to monitor the above frame error rate FER and judge whether or not the frame error rate FER has been improved to such an extent that the difference is suppressed when the result of the judgment is discriminated as true, to immediately terminate the processing of giving the increased amount to the desired- value setting part 41 even when the time passing from the 'auxiliary channel appending point in time' is shorter than the above 'fixed interval' (or the 'variable interval')

In other words, an end point of a period during which such an increased amount is given to the desired-value setting part 41 is maintained at a point in time when the above difference in the power proportion is practically decreased, without any complication of a procedure relating to the association with the terminal 63 and any exchange of special information realizing the association.

Consequently, according to this embodiment, it is avoided with high reliability that the transmission powers of both the 'primary channel' and the 'auxiliary channel' become unnecessarily excessive, without any increase in load on the radio base station and the terminal 63 and any change in the basic channel control procedure.

Figure 7:
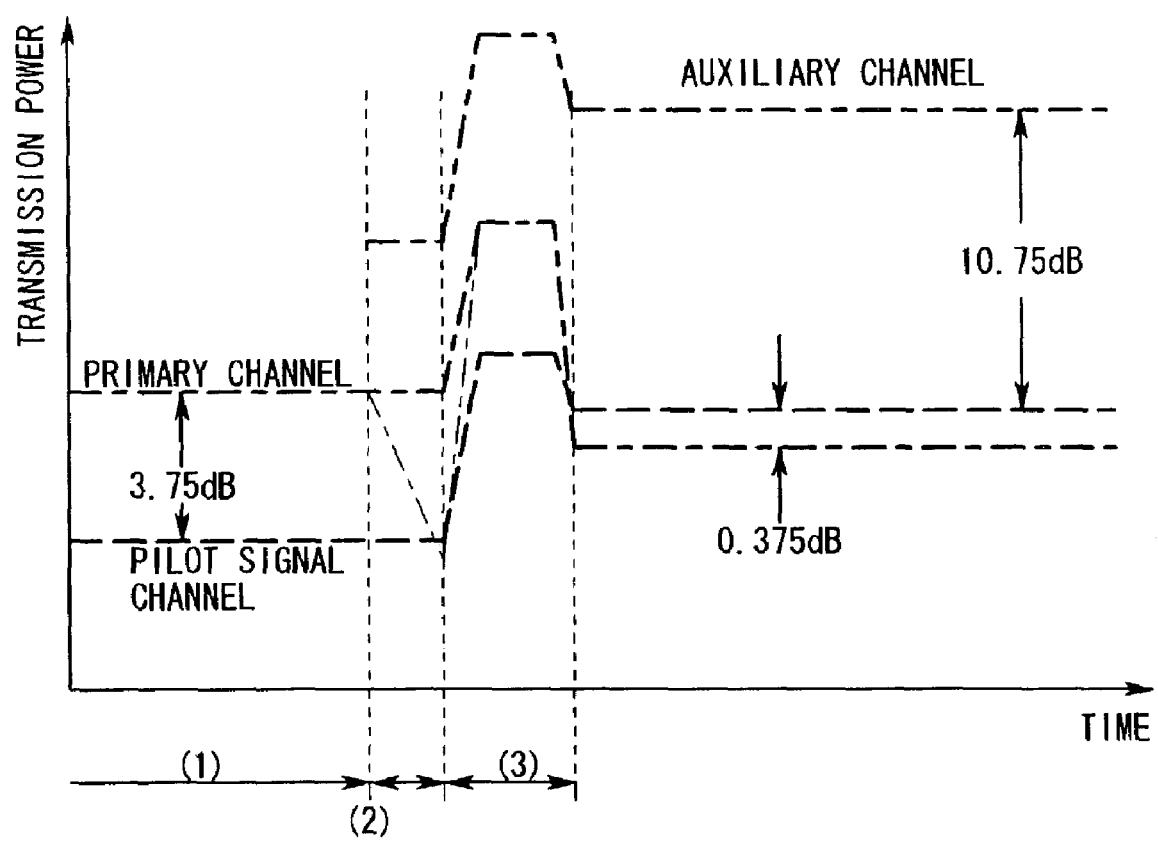
FIG. 7 is a chart explaining the operation of the fifth embodiment of the present invention.
Figure 8:
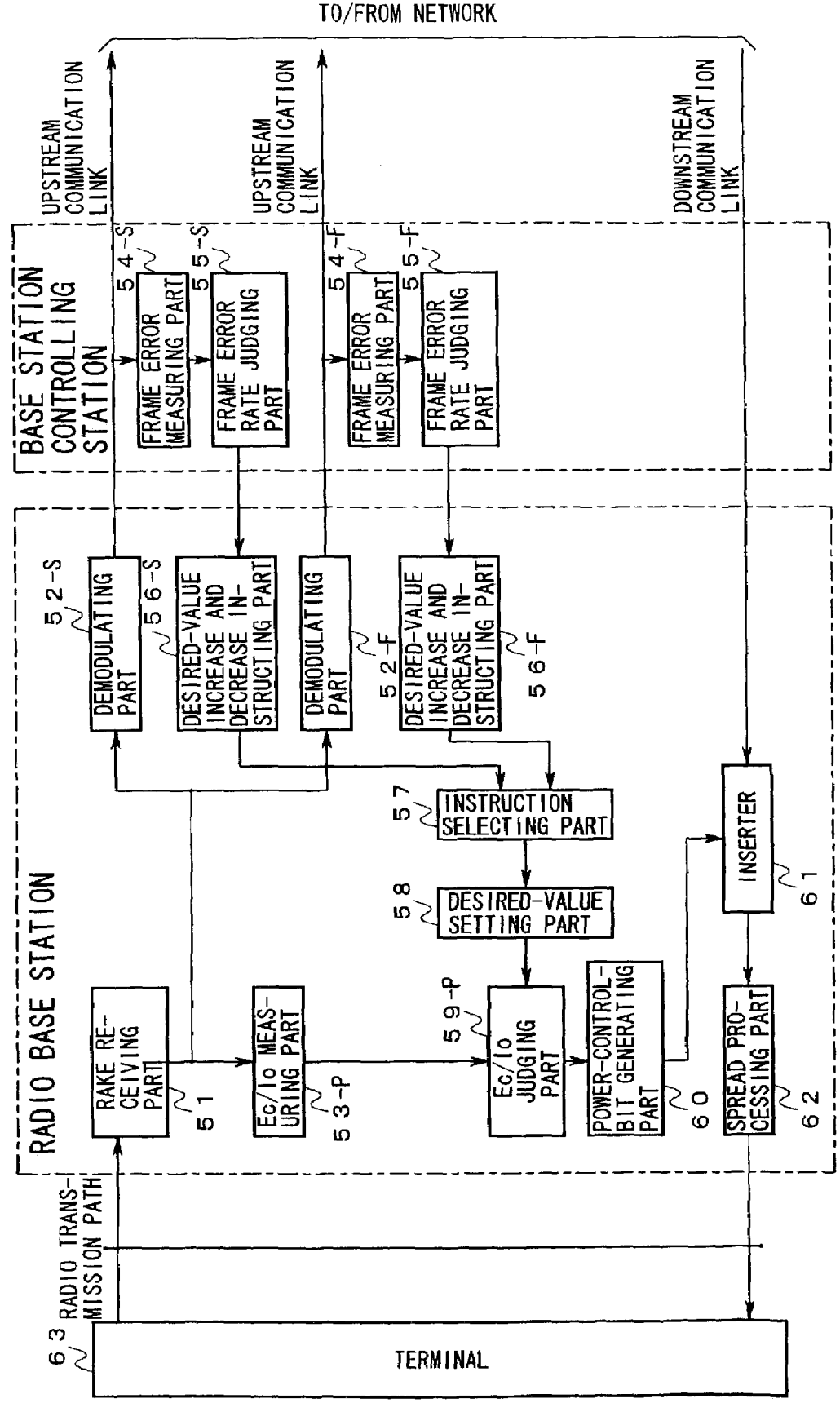
FIG. 8 is a diagram showing a configuration example of a mobile communication system to which a CDMA system is applied.

FIG. 7 is a chart explaining the operation of the fifth embodiment of the present invention.

Hereinafter, the operation of the fifth embodiment of the present invention will be explained with reference to FIG. 4 and FIG. 7.

The characteristic of this embodiment lies in values of the increased amount and the 'fixed interval' to be described later.

When, in the state in which only the 'primary channel' is allotted to a completed call that has occurred in the terminal 63 in addition to the 'pilot signal channel' (FIG. 7 (1)), the processor discriminates, based on the channel control procedure, a point in time when the 'auxiliary channel' is to be allotted to the completed call and transmission for the 'auxiliary channel' is to be started (hereinafter, referred to as an 'auxiliary channel appending point in time') (FIG. 7 (2)), it determines the 'bit rate' to determine an increased amount which is calculated in advance as an appropriate value for the 'bit rate' and which has a larger value as the 'bit rate' is larger, and gives the increased amount to the desired-value setting part 41 only during a period ranging over a preset 'fixed interval' from the above 'auxiliary channel appending point in time' (FIG. 7 (3)), similarly to the first embodiment previously described.

However, the values of the 'fixed interval' and the increased amount are set under the control of the processor as follows.

The value of the 'fixed interval' is set to a smaller value than the value set in the first embodiment.

The value of the increased amount not only has a larger value as the 'bit rate' is larger but also "is larger than the value set in the first embodiment, and even when the above-mentioned value of the 'fixed interval' is set to such a small value, it is set to a large value to such an extent that none of the transmission powers of the 'pilot signal channel', the 'primary channel', and the 'auxiliary channel' during the period ranging over the 'fixed interval' becomes excessively large".

Consequently, according to this embodiment, when the 'auxiliary channel' is additionally allotted to the completed call that has occurred in the terminal 63 after the 'primary channel" is allotted, the transmission powers of these 'primary channel' and 'auxiliary channel' converge in appropriate steady-state values as quickly as possible within the range of responsiveness not only of the terminal 63 but also of each of involved parts of the radio base station and a radio base station controlling station.

Incidentally, in this embodiment, the decrease in the transmission power of the 'primary channel' which has occurred in the conventional art is avoided similarly to the previously described first embodiment.

The present invention, however, is not limited to such a configuration, and as long as the period of the above 'fixed interval' is set to be short to such an extent as to satisfy the standard for transmission quality and service quality with which the length of the period during which the transmission power of the 'primary channel' is decreased is to be secured or the minimum value of the transmission power in the period is to be secured, for example, a starting point of the above period may be put off to a point in time when the transmission quality of the 'primary channel' is lowered due to the fact that the transmission via the 'auxiliary channel' is started without any change in power distribution.

Further, in each of the embodiments described above, the increased amount is set to a larger value as the 'bit rate' is higher.

The present invention, however, is not limited to such a configuration, and for example, in either of the following cases, the above increased amount may be fixed or a common bit rate may be applied to a plurality of bit rates.

the case when the above bit rate is limited only to one value the case when the range of the value of the bit rate is small the case when the deterioration in transmission quality (service quality) and responsiveness, which is caused because a common increased amount is applied to different bit rates, is allowed Further, in each of the embodiments described above, the increased amount of the power proportion to be applied temporarily in order to correct the deterioration in the transmission quality of the 'primary channel' is made to have a binary value (quantization), thereby generating a transmission-power control bit to be transmitted to the terminal 63.

The present invention, however, is not limited to such a configuration, and for example, when the processor performing the channel control can discriminate the transmission power of the 'primary channel' allotted to the terminal 63, the increased amount of power distribution which is obtained as a reduced value of a lack of the transmission power may be made to have a binary value (quantization), thereby generating the above transmission-power control bit.

Further, when the transmission-power control bit is thus generated, the Ec/Io measuring part 53-P, the desired-value setting part 41, and the Ec/Io judging part 59-P which operate in association with one another in order to find the increased amount of the above power distribution need not be provided in the radio base station, and it is also suitable that the above lack of the transmission power is found by the desired-value setting part 41 or the above processor.

Further, in each of the embodiments described above, the radio base station transmits the above 'transmission-power control bit' which is binary information to the terminal 63 in order to enable the transmission-power control, when necessary.

The information to be thus transmitted, however, is not limited to the binary information, and as long as desired responsiveness and precision with which the transmission-power control is to be achieved are guaranteed, it may be multilevel information consistent with the channel control procedure, the channel allocation, and the zone configuration.

Further, in each of the embodiments described above, the present invention is applied to a mobile communication system to which direct sequence is applied.

The present invention, however, is not limited to such direct sequence, and as long as the transmission-power control realizing the solution of the near-far problem is performed, the present invention is similarly applicable to a mobile communication system to which, for example, any multiple access such as frequency hopping, chirp, or others is applied.

Further, in each of the embodiments described above, the present invention is applied to the mobile communication system.

The present invention, however, is not limited to such a mobile communication system, and as long as the above transmission-power control is performed, it is similarly applicable to a radio transmission system in which, for example, radio transmission paths are directly formed (or radio channels are seized) among a plurality of terminals end-to-end.

Further, in each of the embodiments described above, the desired-value setting part 41 is constituted as dedicated hardware.

The present invention, however, is not limited to such a configuration, and the desired-value setting part 41 or both the desired-value setting part 41 and a desired constituent element operating in association with the desired-value setting part 41 may be constituted only of software or constituted as firmware which operates based on a stored logic or stored program control.

Further, the present invention is not limited to the above embodiments and various modifications may be made without departing from the sprit and scope of the invention. Any improvement may be made in part or all of the components.

The invention is not limited to the above embodiments and various modifications may be made without departing from the spirit and scope of the invention. Any improvement may be made in part or all of the components.

What is claimed is:

1. A transmission-power control assisting apparatus, comprising:
   a transmission quality monitoring section for monitoring an trot, relative to a predetermined threshold, in transmission quality of any one of a plurality of radio channels which includes a specific radio channel, said plurality of radio channels to be set transmission powers en bloc as a value relative to a transmission power of the specific radio channel under transmission-power control;
   a period determining section for determining a predetermined period of time from either a point in time of an opportunity to append a radio channel other than said specific radio channel to said plurality of radio channels, or from a point in time when the radio channel is allowed to be appended;
   a desired-value setting section for varying a desired value for the transmission power of said specific radio channel by a predetermined value to suppress said error during a period other than said predetermined period of time and by a value larger than said predetermined value during said predetermined period of time; and
   a transmission-power update requesting section for transmitting at a predetermined frequency a control signal for the transmission-power control to a transmitting end which performs transmission via said plurality of radio channels, based on relation between the desired value set by said desired-value setting section and reception quality of said plurality of radio channels.

2. The transmission-power control assisting apparatus according to claim 1, further comprising:
   a notifying section for determining, on said opportunity, a value higher than the desired value for the transmission power of said specific radio channel which is to be set at the point in time of the opportunity and for notifying the higher value to said transmitting end via any one of said plurality of radio channels; and
   a response discriminating section for discriminating a response transmitted from said transmitting end via any one of said plurality of radio channels and indicating that the transmission power of said specific radio channel is set to said higher value, wherein
   said transmission-power update requesting section for suspending the transmission of said control signal to said transmitting end when said response discriminating section discriminates said response.

3. The transmission-power control assisting apparatus according to claim 1, further comprising:
   a notifying section for determining, on said opportunity, a value higher than the desired value for the transmission power of said specific radio channel which is to be set at the point in time of the opportunity and for notifying die higher value to said transmitting end via any one of said plurality of radio channels; and
   a response judging section for judging whether or not the transmission power of said specific radio channel notified from said transmitting end via any one of said plurality of radio channels has a value equal to or higher than said higher value, wherein
   said transmission-power update requesting section for suspending the transmission of said control signal to said transmitting end when said judgment results to be true.

4. The transmission-power control assisting apparatus according to claim 1, wherein:
   said large value is set to a value exceeding a steady-state value, which is a value of the transmission power of the specific radio channel after the radio channel other than said specific radio channel is appended to said plurality of radio channels; and
   a length of said period is set to be short to such an extent that for the transmission powers of said plurality of radio channels do not exceed maximum transmission powers allowable for the transmission powers.

5. The transmission-power control assisting apparatus according to claim 1, wherein
   said desired-value setting section for setting the desired value for the transmission power of said specific radio channel to a larger value, the larger the value is for a channel capacity of the radio channel to be appended at said opportunity, or for a transmission rate to be secured within a range of the channel capacity.

6. The transmission-power control assisting apparatus according to claim 1, wherein
   said transmission-power update requesting section compares the error monitored by said transmission quality monitoring section with a predetermined upper limit value, and suspends said transmission when the error becomes lower than the upper limit value.

7. A transmission-power control assisting apparatus, comprising:

a transmission quality monitoring section for monitoring an error, relative to a predetermined threshold, in transmission quality of any one of a plurality of radio channels which includes a specific radio channel, said plurality of radio channels so be set transmission powers en bloc as a value relative to a transmission power of the specific radio channel under transmission-power control;

a period determining section for determining a period of time, which is longer, the smaller sad error is, from either a point in time of an opportunity to append a radio channel other than said specific radio channel to said plurality of radio channels, or from a point in time when the radio channel is allowed to be appended;

a desired-value setting section for setting a desired value for the transmission power of said specific radio channel to such a value as to suppress said error during a period other than said period of time and to a value larger than said value during said period of time; and a transmission-power update requesting section for transmitting at a predetermined frequency a control signal for the transmission-power control to a transmitting end which performs transmission via said plurality of radio channels, based on relation between the desired value set by said desired-value setting section and reception quality of said plurality of radio channels.

8. The transmission-power control assisting apparatus according to claim 7, further comprising:

a notifying section for determining, on said opportunity, a value higher than the desired value for the transmission power of said specific radio channel which is to he set at the point in time of the opportunity and for notifying the higher value to said transmitting end via anyone of said plurality of radio channels; and a response discriminating section for discriminating a response transmitted from said transmitting end via any one of said plurality of radio channels and indicating that the transmission power of said specific radio channel is set to said higher value, wherein said transmission-power update requesting section for suspending the transmission of said control signal to said transmitting end when said response discriminating section discriminates said response.

9. The transmission-power control assisting apparatus according to claim 7, further comprising:

a notifying section for determining, on said opportunity, a value higher than the desired value for the transmission power of said specific radio channel which is to be set at the point in time of the opportunity and for notifying the higher value to said transmitting end via any one of said plurality of radio channels; and a response judging section for judging whether or nor the transmission power of said specific radio channel notified from said transmitting end via any one of said plurality of radio channels has a value equal to or higher than said higher value, wherein said transmission-power update requesting section for suspending the transmission of said control signal to said transmitting end when said judgment results to be true.

10. The transmission-power control assisting apparatus according to claim 7, wherein:

said large value is set to a value exceeding a steady-state value, which is a value of the transmission power of the specific radio channel after the radio channel other than said specific radio channel is appended to said plurality of radio channels; and a length of said period is set to be short to such an extent that for the transmission powers of said plurality of radio channels do not exceed maximum transmission powers allowable for the transmission powers.

11. The transmission-power control assisting apparatus according to claim 7, wherein said desired-value sensing section for setting the desired value for the transmission power of said specific radio channel to a larger value, the larger the value is for a channel capacity of the radio channel to be appended at said opportunity, or for a transmission rare to be secured within a range of the channel capacity.

12. The transmission-power control assisting apparatus according to claim 7, wherein said transmission-power update requesting section compares the error monitored by said transmission quality monitoring section with a predetermined upper limit value, and suspends said transmission when the error becomes lower than the upper limit value.

13. A transmission-power control assisting apparatus, comprising:

a transmission quality monitoring section for monitoring an error, relative to a predetermined threshold, in transmission quality of any one of a plurality of radio channels which includes a specific radio channel, said plurality of radio channels to be set transmission powers en bloc as a value relative to a transmission power of the specific radio channel under transmission-power control;

a period determining section for determining a predetermined period of time from either a point in time of an opportunity to append a radio channel other than said specific radio channel to said plurality of radio channels or from a point in time when the radio channel is allowed to be appended;

a desired-value setting section for setting a desired value for a proportion of the transmission power of said specific radio channel to a sum total of the transmission powers of said plurality of radio channels to such a value as to suppress said error during a period other than said period of time and to a value larger than said value during said period of time; and a transmission-power update requesting section for comparing a proportion with the desired value set by said desired-value setting section, the proportion being a proportion of a level of an arriving wave received via said specific radio channel to a sum total of levels of arriving waves received via said plurality of radio channels, and said transmission-power update requesting section transmitting at a predetermined frequency a control signal for the transmission-power control based on a difference between the proportion and the desired value to a transmitting end performing transmission via the plurality of radio channels.

14. The transmission-power control assisting apparatus according to claim 13, further comprising:

a notifying section for determining, on said opportunity, the proportion of the transmission power of said specific radio channel to be at a value higher than a proportion of the transmission power of said specific radio channel which is to be set at the point in time of the opportunity, and for notifying the determined proportion to said transmitting end via any one of said plurality of radio channels; and a response discriminating section for discriminating a response which is transmitted from said transmitting end via any one of said plurality of radio channels and which indicates that the proportion of the transmission power of said specific radio channel is set to said higher value, wherein said transmission-power update requesting section for suspending the transmission of said control signal to said transmitting end when said response discrimination section discriminates said response.

15. The transmission-power control assisting apparatus according to claim 13, further comprising:

a notifying section for determining, on said opportunity, a value higher than a proportion of the transmission power of said specific radio channel which is to be set at the point in time of the opportunity, and for notifying the higher value to said transmitting end via any one of said plurality of radio channels; and a response judging section for judging whether or not the proportion of transmission power of said specific radio channel notified from said transmitting end via any one of said plurality of radio channels has a value equal to said higher value, wherein said transmission-power update requesting section for suspending the transmission of said control signal to said transmitting end when said judgment results to be true.

16. The transmission-power control assisting apparatus according to claim 13, wherein:

said large value is set to a value exceeding a steady-state value, which is a value of the proportion of the transmission power of the specific radio channel after the radio channel other than said specific radio channel is appended to said plurality of radio channels; and a length of said period is set to be short to such an extent that the transmission powers of said plurality of radio channels do not exceed maximum transmission powers allowable for the transmission powers.

17. The transmission-power control assisting apparatus according to claim 13, wherein said transmission-power update requesting section compares the error monitored by said transmission quality monitoring section with a predetermined upper limit value, and suspends said transmission when the error becomes lower than the upper limit value.

18. The transmission-power control assisting apparatus according to claim 13, wherein said desired-value setting section for setting the desired value for the proportion of transmission power of said specific radio channel to a larger value, the larger the value is for a channel capacity of the radio channel to be appended at said opportunity, or for a transmission rate to be secured within a range of the channel capacity.

19. A transmission-power control assisting apparatus, comprising:

a transmission quality monitoring section for monitoring an error, relative to a predetermined threshold, in transmission quality of any one of a plurality of radio channels which includes a specific radio channel, said plurality of radio channels to be set transmission powers en bloc as a value relative to a transmission power of the specific radio channel under transmission-power control;

a period determining section for determining a period of time, which is longer, the smaller said error is, from either a point in time of an opportunity to append a radio channel other than said specific radio channel to said plurality of radio channels, or from a point in time when the radio channel is allowed to be appended;

a desired-value setting section for setting a desired value for a proportion of the transmission power of said specific radio channel to a sum total of the transmission powers of said plurality of radio channels to such a value as to suppress said error during a period other than said period of rime and to a value larger than said value during said period of time; and a transmission-power update requesting section for comparing a proportion with the desired value set by said desired-value setting section, the proportion being a proportion of a level of an arriving wave received via said specific radio channel to a sum total of levels of arriving waves received via said plurality of radio channels, and said transmission-power update requesting section transmitting at a predetermined frequency a control signal for the transmission-power control based on a difference between the proportion and the desired value to a transmitting end performing transmission via the plurality of radio channels.

20. The transmission-power control assisting apparatus according to claim 19, further comprising:

a notifying section for determining, on said opportunity, the proportion of the transmission power of said specific radio channel to be at a value higher than a proportion of the transmission power of said specific radio channel which is to be set at the point in time of the opportunity, and for notifying the determined proportion to said transmitting end via any one of said plurality of radio channels; and a response discriminating section for discriminating a response which is transmitted from said transmitting end via any one of said plurality of radio channels and which indicates that the proportion of the transmission power of said specific radio channel is set to said higher value, wherein said transmission-power update requesting section for suspending the transmission of said control signal to said transmitting end when said response discriminating section discriminates said response.

21. The transmission-power control assisting apparatus according to claim 19, further comprising:

a notifying section for determining, on said opportunity, a value higher than a proportion of the transmission power of said specific radio channel which is to he set at the point in time of the opportunity, and for notifying the higher value to said transmitting end via anyone of said plurality of radio channels; and a response judging section for judging whether or no; the proportion of transmission power of said specific radio channel notified item said transmitting end via any one of said plurality of radio channels has a value equal to said higher value, wherein said transmission-power update requesting section for suspending the transmission of said control signal to said transmitting end when said judgment results to be true.

22. The transmission-power control assisting apparatus according to claim 19, wherein:

said large value is set to a value exceeding a steady-state value, which is a value of the proportion of the transmission power of the specific radio channel after the radio channel other than said specific radio channel is appended to said plurality of radio channels; and a length of said period is set to be short to such an extent that the transmission powers of said plurality of radio channels do not exceed maximum transmission powers allowable for the transmission powers.

23. The transmission-power control assisting apparatus according to claim 19, wherein
said transmission-power update requesting section compares the error monitored by said transmission quality monitoring section with a predetermined upper limit value, and suspends said transmission when the error becomes lower than the upper limit value.

24. The transmission-power control assisting apparatus according to claim 19, wherein said desired-value setting section for setting the desired value for the proportion of the transmission power of said specific radio channel to a larger value, the larger rite value is for a channel capacity of the radio channel to be appended at said opportunity, or for a transmission rate to be secured within a range of the channel capacity.

* * * * *